Jan. 27, 1970 R. J. LUDLAM 3,492,585

BATTERY-OPERATED AUDIO SYSTEM HAVING MEANS FOR PROVIDING REDUCED BATTERY CURRENT DRAIN

Filed Nov. 16, 1966

INVENTOR.
RALPH JOSEPH LUDLAM

BY Richard E. Bee

ATTORNEY

United States Patent Office 3,492,585
Patented Jan. 27, 1970

3,492,585

BATTERY-OPERATED AUDIO SYSTEM HAVING MEANS FOR PROVIDING REDUCED BATTERY CURRENT DRAIN

Ralph Joseph Ludlam, Benton Harbor, Mich., assignor to Heath Company, St. Joseph, Mich., a corporation of Delaware Filed Nov. 16, 1966, Ser. No. 594,841
Int. Cl. H04b *1/16*; H03f *3/20, 1/02*
U.S. Cl. 325—492 8 Claims

ABSTRACT OF THE DISCLOSURE

In a portable radio receiver a class B audio amplifier powered by a battery is inductively coupled by a transformer to a loudspeaker. The transformer includes primary and secondary coils, the primary coil being coupled to the output of the amplifier. A switch coupled to a volume control button on the receiver console may be operated to apply either the full secondary or a portion thereof to the speaker. When the receiver may be operated at a reduced volume, the switch is operated to apply only said portion of the secondary to the speaker. This has the advantageous effect of correspondingly reducing the amount of current which is taken by the amplifier from the battery.

Figure 1:
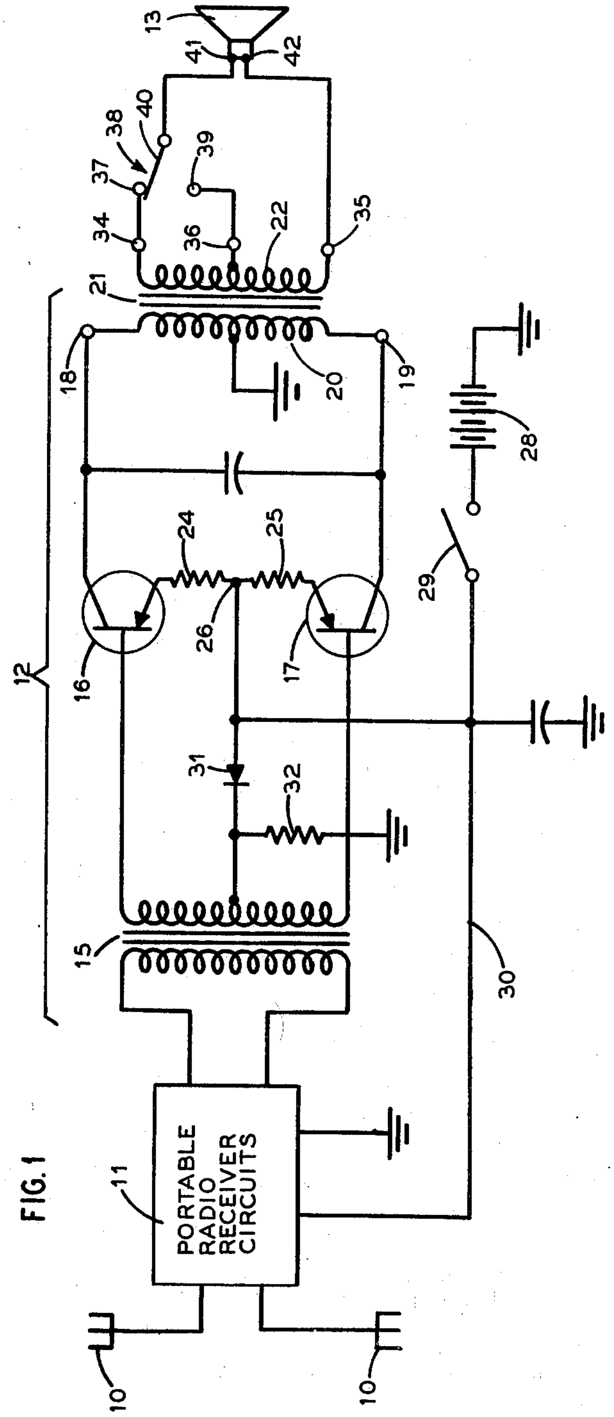

This invention relates to audio systems and, particularly, to battery-operated audio amplifier systems. The present invention is particularly useful in the audio output stages of battery-operated portable radio receivers.

In the case of a battery-operated portable radio receiver, it is always desirable to draw as little current as possible from the battery during the operation of the receiver. Probably the major source of battery current drain in most portable receivers is the audio output stage. Such stages are designed in accordance with the maximum audio output power that it is desired to deliver to the loudspeaker. In general, the larger the maximum output power the audio stage is designed to provide, the larger will be the current drain from the battery.

It frequently happens, however, that for a fair amount of the time the receiver will be used under conditions where considerably less than maximum power is required of the audio output stage. For example, portable radio receivers are frequently designed for both indoor and outdoor use. In order to provide satisfactory operation out of doors, it is necessary to design the receiver to be able to provide a relatively large amount of audio output power. When using the receiver indoors, however, considerably less than this maximum audio power is usually required.

The present invention provides a novel means such that when considerably less than the maximum output is required, the current drain on the battery may be considerably reduced over what would have otherwise been the case. This is accomplished by tapping the secondary winding of the audio output transformer at a suitable point intermediate the normal end terminals of the secondary winding. The loudspeaker is then switched from across the total secondary winding to a lesser portion of the secondary winding whenever it is desired to reduce the battery current drain when operating at lower power levels.

For a better understanding of the present invention, together with other and further objects thereof, reference is had to the following description taken in connection with the accompanying drawings, the scope of the invention being pointed out in the appended claims.

Figures 2A, 2B:
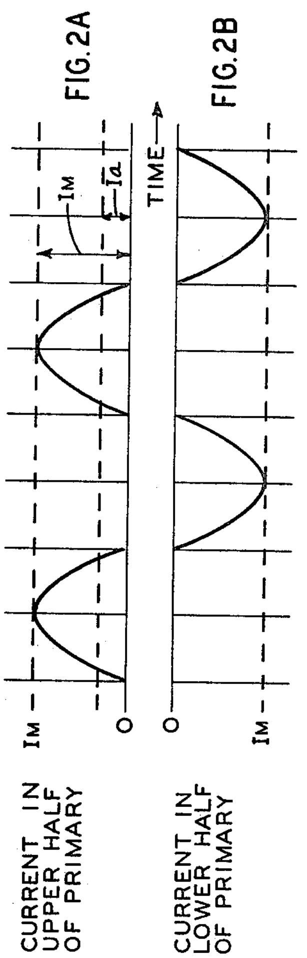

Referring to the drawings:

FIG. 1 is a circuit diagram of a portable radio receiver showing the details of the audio output stage of such receiver in a schematic manner; and FIGS. 2A and 2B are waveforms used in explaining the operation of the audio output circuit shown in FIG. 1.

Referring to FIGURE 1 of the drawings, there is shown a complete battery-operated portable radio receiver which includes an antenna system 10, 10, portable radio receiver circuits 11, an audio amplifier circuit 12 and a loudspeaker 13. The box 11 labelled as "portable radio receiver circuits" includes the usual radio-frequency stages, oscillator-mixer stage, intermediate-frequency stages, second detector stage and, as required, preliminary audio stages.

The audio amplifier circuit 12, which is the audio output stage of the radio receiver, is a class B push-pull audio amplifier circuit. It includes an input transformer 15 which drives the base electrodes of a pair of transistors 16 and 17 in a push-pull manner. The collector electrodes of the transistors 16 and 17 are connected to terminals 18 and 19 of the primary winding 20 of an output transfromer 21. Output transformer 21 also includes a secondary winding 22. The emitter electrodes of transistors 16 and 17 are connected by way of resistors 24 and 25, respectively, to a common circuit point 26.

Direct-current power for operating the amplifier circuit 12, as well as the remainder of the radio receiver circuits, is provided by a battery 28. This battery is connected by way of an "on-off" switch 29 to the common point 26 in amplifier circuit 12. It is also connected by way of a lead 30 to the remainder of the receiver circuits located in box 11.

Direct-current bias for the base electrodes of transistors 16 and 17 is provided by means of a semiconductor diode 31 and a resistor 32. In particular, the flow of current from the battery 28 through diode 31 and resistor 32 provides a small voltage drop across the conductive diode 31 which is sufficient to maintain the transistors 16 and 17 just slightly conductive in the absence of an input signal.

The secondary winding 22 of the output transformer 21 includes a pair of end terminals or end taps 34 and 35 and an intermediate terminal or tap 36. End tap 34 is connected to a fixed contact 37 of a switch 38, while the intermediate tap 36 is connected to a second fixed contact 39 of the switch 38. A movable contact or blade member 40 of the switch 38 is connected to a first signal input terminal 41 of the loudspeaker 13. A second input terminal 42 of the loudspeaker 13 is connected to the lower end tap 35 on the secondary winding 22. By way of example, the intermediate tap 36 may be located at the midpoint on the secondary winding 22.

As will be seen, the switch 38 represents a "battery saver" switch for reducing the drain on the battery 28. This battery saver switch 38 and the "on-off" power switch 29 further include linkage means (not shown) for connecting them to respective control knobs or control means (not shown) located on the front control panel of the radio receiver. In the case of the battery saver switch 38, the front panel control knob serves to enable the receiver user to set the movable contact 40 to enable the normal operating position where it is in contact with the fixed contact 37 or to the battery saver position where it is in contact with the fixed contact 39.

Considering the operation of the audio system formed by the audio amplifier circuit 12 and loudspeaker 13, the amplifier circuit 12 is a class B amplifier. Consequently, the two transistors 16 and 17 are biased approximately to cut off. When a signal voltage is applied to the input transformer 15, one of the transistors 16 or 17 amplifies the positive half cycles of the signal voltage, while the other transistor amplifiers the negative half cycles. The output transformer 21 then combines these half cycles in such a manner as to give an amplified reproduction of the applied signal.

The half cycle pulses of current flowing in the two halves of the primary winding 20 of the output transformer 21 are illustrated in FIGURES 2A and 2B, respectively. Assuming the current pulses are sinusoidal. the average current $I_a$ flowing through one half of the primary winding 20 is:

$$I_a=\frac{I_m}{\pi} \qquad (1)$$

where $I_m$ denotes the peak value of the current pulses through half of the primary. Since there are two halves, the total D.C. current drawn by the two collector circuits is:

$$I_{dc}=2I_a=\frac{2I_m}{\pi} \qquad (2)$$

Since the collector current pulse of each individual transistor flows through only half of the output transformer primary, the combined output of the two transistors is equivalent to an alternating current having a peak value $I_m$ flowing through half of the transformer primary, or to a current $I_m/2$ flowing through the entire primary. In other words, the equivalent peak current value $I_p$ for the entire primary is:

$$I_p=\frac{I_m}{\pi} \qquad (3)$$

The alternating-current power delivered to the load, in this case, the loudspeaker 13, for the case of a very nearly ideal output transformer is:

$$P_{ac}=I_{rms}^2 \cdot Z_p \qquad (4)$$

where $P_{ac}$ is the alternating-current power, $I_{rms}$ is the effective or root-mean-square value of the equivalent current flowing through the entire primary winding 20 and $Z_p$ is the impedance seen looking into the terminals 18 and 19 of the primary winding 20. The relationship between $I_{rms}$, $I_p$ and $I_m$ is:

$$I_{rms}=\frac{I_p}{\sqrt{2}}=\frac{I_m}{2\sqrt{2}} \qquad (5)$$

Substituting the right-hand term of Equation 5 into Equation 4 and simplifying gives:

$$P_{ac}=\frac{I_m^2 \cdot Z_p}{8} \qquad (6)$$

This gives the alternating-current power in terms of the peak value $I_m$ of the current pulses drawn by each of the transistors 16 and 17.

This may be rewritten in terms of the total D.C. current drawn from the battery 28 by the collector circuits by combining Equation 2 with Equation 6, which gives:

$$P_{ac}=\frac{\pi^2}{32} \cdot I_{dc}^2 \cdot Z_p \qquad (7)$$

The relationship between the primary impedance $Z_p$, the turns ratio for the output transformer 21 and the loudspeaker impedance, assuming the output transformer 21 is an ideal transformer, is given by the following expression:

$$Z_p=\left(\frac{N_p}{N_s}\right)^2 \cdot Z_L \qquad (8)$$

where $N_p$ is the total number of turns on the primary winding 20 (between terminals 18 and 19), $N_s$ is the number of turns of the secondary wninding 22 which are being used and $Z_L$ is the load impedance seen looking into the input terminals 41 and 42 of the loudspeaker 13.

Substituting Equation 8 into Equation 7 and solving for $I_{dc}$ gives:

$$I_{dc}=\frac{4\sqrt{2}}{\pi} \cdot \left(\frac{N_s}{N_p}\right) \cdot \sqrt{\frac{P_{ac}}{Z_L}} \qquad (9)$$

This equation gives the total D.C. current being drawn by the two collector circuits of the amplifier circuit 12 for any given level of audio output power $P_{ac}$.

As seen from Equation 9, the D.C. current drawn by the audio output circuit is proportional to the number of turns $N_s$ of the secondary winding 22 that the load is placed across. Thus, for the same given value of output power $P_{ac}$, the D.C. current drain can be reduced by reducing the number of turns $N_s$ on the secondary winding 22. This is what is accomplished when the battery saver switch 38 is switched from the fixed contact 37 position to the fixed contact 39 position. What happens is that reducing the number of secondary turns increases the impedance $Z_p$ seen across the primary winding, as indicated by Equation 8. This reduces the current drain. This does, however, also reduce the maximum output power which may be taken from the audio output circuit. This is frequently permissible, however, since the radio receiver is frequently used under conditions where enjoyable listening may be had at power levels considerably less than the maximum possible power level.

It is helpful to consider a specific example which has been constructed and tested. In particular, for an actual portable radio receiver having a loudspeaker impedance $Z_L$ of 3.2 ohms, an audio output circuit having a primary output winding impedance $Z_p$ of 250 ohms when the entire secondary winding is used (turns ratio of 8.84 to 1) and with the intermediate tap point 36 located at the halfway point on the secondary winding 22, the following relationships were found to exist:

| Audio Output Power, mw. | Total Battery Current, ma. | | Saving in Current, Percent |
|---|---|---|---|
| | 100% Tap | 50% Tap | |
| 150 | 54 | 37 | 31 |
| 50 | 36 | 26 | 28 |

The current values given in this table are for the total D.C. current being drawn from the battery 28 with the complete receiver in operation. Consequently, some 10 to 20 milliamperes of this current represents current being supplied to the remainder of the radio receiver circuits other than the output circuit of the amplifier 12. As seen, there is an approximately 30% saving in total battery current when the switch 38 is in the battery saver position (50% tap position).

This same radio receiver was designed to provide a maximum (10% distortion) audio output power of 570 milliwatts. This is obtained when the switch 38 is in the normal position (contact 37). When the switch 38 is set to the battery saver position (contact 39), the maximum output power is reduced to 172 milliwatts.

The above values were determined by actual measurements on an existing receiver incorporating the present invention.

In place of tapping the secondary winding of the output transformer, the advantages of the present invention can also be realized to some extent by instead tapping the voice coil winding on the loudspeaker. In such case, assuming the example of a midpoint tap, the voice coil winding is constructed to provide twice the normal load impedance. The battery saver switch is then connected so that, by flipping the switch, either the full voice coil winding (e.g., 6.4 ohms) or only half of the voice coil winding (e.g., 3.2 ohms) is connected across the secondary of the output transformer. The full voice coil winding position constitutes the battery saver position and the half voice coil winding position constitutes the normal operating position for obtaining maximum output power.

Use of the present invention eliminates the need to compromise the circuit design between power output capability and longer battery life. The designer can incorporate any maximum power level deemed necessary and allow the user to choose between that power level and a lower more efficient level, at his discretion, by simply flipping a switch, namely, the switch 38.

While there has been described what is at present considered to be the preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. An audio system comprising:
- a class B audio amplifier circuit having an output transformer having a secondary winding having a pair of end taps and an intermediate tap;
- a switch having a pair of fixed contacts and a movable contact;
- a loudspeaker having a pair of signal input terminals; and
- means connecting one of the fixed switch contacts to one of the transformer end taps, the other fixed switch contact to the transformer intermediate tap, one of the loudspeaker input terminals to the movable switch contact and the other loudspeaker input terminal to the other transformer end tap, whereby reduced battery current drain may be provided when operating at lower power levels by setting the switch to the position where the movable contact is in contact with the fixed contact which is connected to the transformer intermediate tap.

2. An audio system in accordance with claim 1 wherein the audio amplifier circuit is a push-pull amplifier circuit.

3. In a portable radio receiver, the combination comprising:
- a class B audio amplifier circuit having an output transformer having a secondary winding having a pair of end taps and an intermediate tap;
- a switch having a pair of fixed contacts and a movable contact;
- a loudspeaker having a pair of signal input terminals;
- means connecting one of the fixed switch contacts to one of the transformer end taps, the other fixed switch contact to the transformer intermediate tap, one of the loudspeaker input terminals to the movable switch contact and the other loudspeaker input terminal to the other transformer end tap; and
- control means located on the control panel of the radio receiver and coupled to the switch for controlling the setting thereof, whereby reduced battery current drain may be provided when operating at lower power levels by setting the switch to the position where the movable contact is in contact with the fixed contact which is connected to the transformer intermediate tap.

4. A portable radio receiver in accordance with claim 3 wherein the audio amplifier circuit is a push-pull amplifier circuit.

5. An audio system comprising:
- a class B audio amplifier circuit having an output transformer having a secondary winding having a pair of end taps;
- a switch having a pair of fixed contacts and a movable contact;
- a loudspeaker having a voice coil winding having a pair of end terminals and an intermediate terminal; and
- means connecting one of the fixed switch contacts to one of the voice coil end terminals, the other fixed switch contact to the voice coil intermediate terminal, one of the secondary winding end taps to the movable switch contact and the other secondary winding end tap to the other voice coil end terminal, whereby reduced battery current drain may be provided when operating at lower power levels by setting the switch to the position where the movable contact is in contact with the fixed contact which is connected to the voice coil end terminal.

6. A battery energized audio amplifier system comprising:
- a class B operated amplifier circuit including a transformer providing a secondary winding signal output coupling to a loudspeaker voice coil winding; and
- a switch means in signal coupling path between the transformer secondary winding and the loudspeaker voice coil winding, said switch means being arranged for selective connection to different winding portions of said transformer secondary and voice coil windings so as to selectively change the turns coupling ratio between said secondary transformer and loudspeaker voice coil windings.

7. A battery energized audio amplifier system as defined in claim 6, wherein said transformer secondary winding includes a terminal tap intermediate the winding end taps, and said switch means is selectively operable to provide in one position, a circuit path coupling the signal output produced across the secondary end taps to said loudspeaker voice coil end taps, and in a second position, to provide a circuit path coupling the signal output produced across the secondary winding intermediate tap and one of the secondary winding end taps to said loudspeaker voice coil end taps.

8. A battery energized audio amplifier system as defined in claim 6, wherein said voice coil winding includes a tap connection intermediate its end taps, and said switch means is selectively operable to provide in one position, a circuit path coupling the signal output produced across the secondary winding end taps to the end taps of said voice coil winding, and in a second position to provide a circuit path coupling the signal output produced across the secondary winding end taps to the intermediate tap and one of the end taps of said voice coil winding.

References Cited

UNITED STATES PATENTS 2,218,094 10/1940 Pitsch ---------- 330—196 X

ROBERT L. GRIFFIN, Primary Examiner

R. MURRAY, Assistant Examiner

U.S. Cl. X.R.

179—1; 330—196